US008874585B2

(12) United States Patent
Oliver et al.

(10) Patent No.: US 8,874,585 B2
(45) Date of Patent: Oct. 28, 2014

(54) METHOD AND APPARATUS FOR USER BASED SEARCH IN DISTRIBUTED INFORMATION SPACE

(75) Inventors: Ian Justin Oliver, Söderkulla (FI); Guido Peter Grassel, Espoo (FI); Mikko Johannes Honkala, Helsinki (FI); Juha-Pekka Luoma, Espoo (FI)

(73) Assignee: Nokia Corporation, Espoo (FI)

( * ) Notice: Subject to any disclaimer, the term of this patent is extended or adjusted under 35 U.S.C. 154(b) by 245 days.

(21) Appl. No.: 12/797,284

(22) Filed: Jun. 9, 2010

(65) Prior Publication Data

US 2011/0307489 A1 Dec. 15, 2011

(51) Int. Cl.
G06F 17/30 (2006.01)
(52) U.S. Cl.
CPC .............................. G06F 17/30864 (2013.01)
USPC .......................................................... 707/741
(58) Field of Classification Search
None
See application file for complete search history.

(56) References Cited

U.S. PATENT DOCUMENTS

| 5,600,831 | A | 2/1997 | Levy et al. |
| 6,006,217 | A | 12/1999 | Lumsden |
| 6,085,176 | A | 7/2000 | Woolston |
| 6,338,059 | B1 | 1/2002 | Fields et al. |
| 7,599,966 | B2 | 10/2009 | Dissett et al. |
| 2003/0005412 | A1* | 1/2003 | Eanes ........................... 717/120 |
| 2004/0205772 | A1* | 10/2004 | Uszok et al. .................. 719/317 |
| 2005/0004898 | A1 | 1/2005 | Bluhm |
| 2005/0027687 | A1* | 2/2005 | Nowitz et al. ..................... 707/3 |
| 2008/0195601 | A1* | 8/2008 | Ntoulas et al. .................... 707/5 |
| 2008/0281793 | A1* | 11/2008 | Mathur .............................. 707/3 |
| 2009/0076899 | A1* | 3/2009 | Gbodimowo ................... 705/14 |

OTHER PUBLICATIONS

Agent Space Architecture for Search Engines, Choi et al., Proceedings of the IEEE/WIC/ACM International Conference on Intelligent Agent Technology (IAT'04), Sep. 20-24, 2004, pp. 1-5.
iboogie, accessed on: Jan. 5, 2011, http://iboogie.com/searchtree.asp, 1 page.
Yabigo, accessed on: Jan. 5, 2011, htttp://yabigo.com/, 1 page.
U.S. Appl. No. 12/126,402, filed May 23, 2008, Ian Oliver.
U.S. Appl. No. 12/484,842, filed Jun. 15, 2009, Ian Justin Oliver.
U.S. Appl. No. 12/569,152, filed Sep. 29, 2009, Ian Justin Oliver.
U.S. Appl. No. 12/603,319, filed Oct. 21, 2009, Ian Justin Oliver.

* cited by examiner

*Primary Examiner* — Bai D. Vu
(74) *Attorney, Agent, or Firm* — Ditthavong & Steiner, P.C.

(57) ABSTRACT

An approach is provided for enabling dynamic user based search within a distributed information space. A request for conducting a search over one or more information spaces is distributed to one or more autonomous agents. The autonomous agents process the request according to one or more functions specific to the one or more autonomous agents. Results are rendered to an interface of a user device in response to the search request.

20 Claims, 9 Drawing Sheets

200

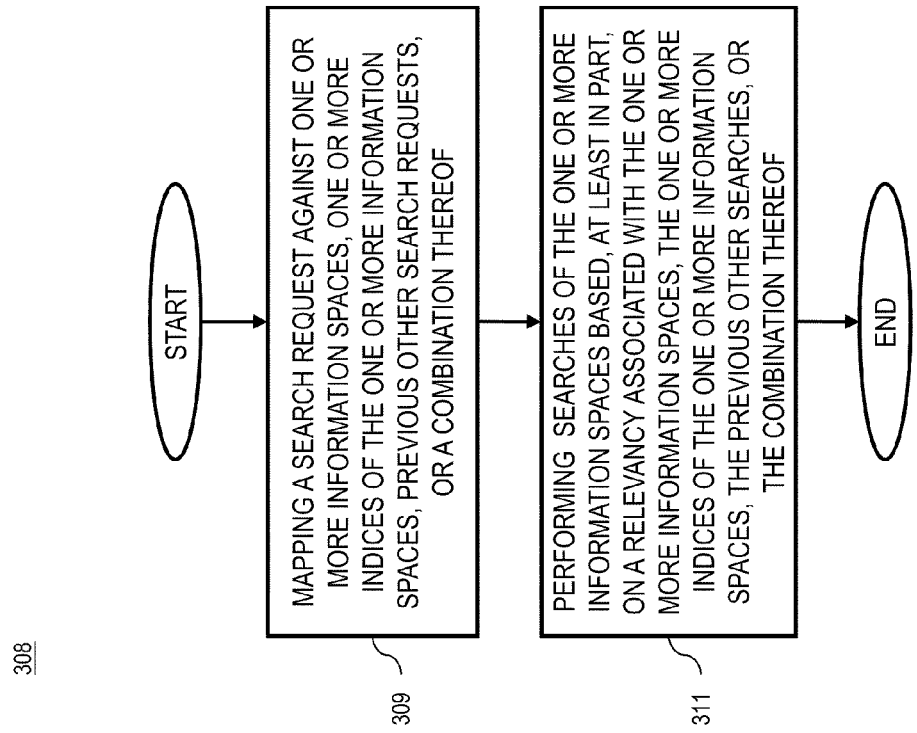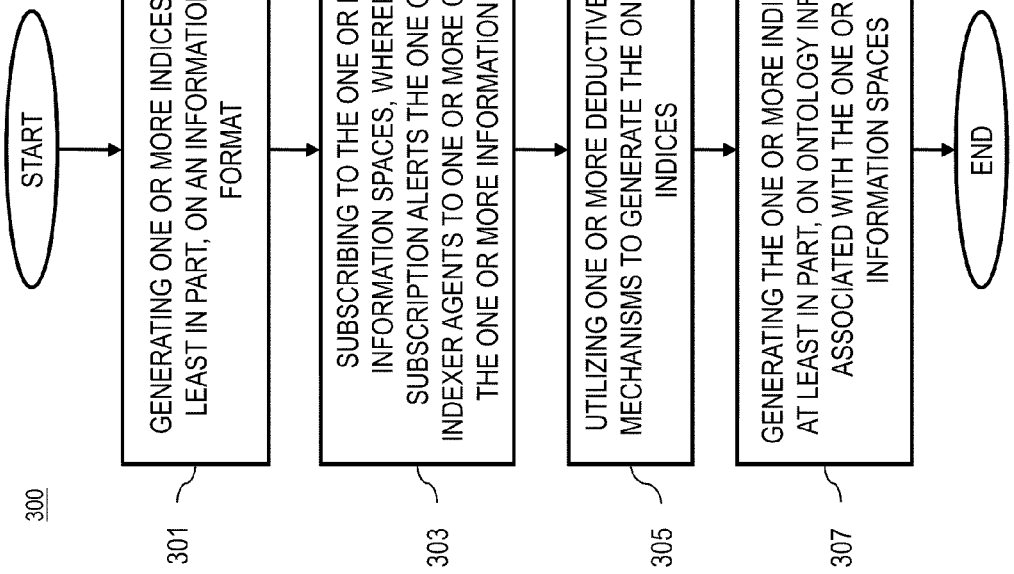

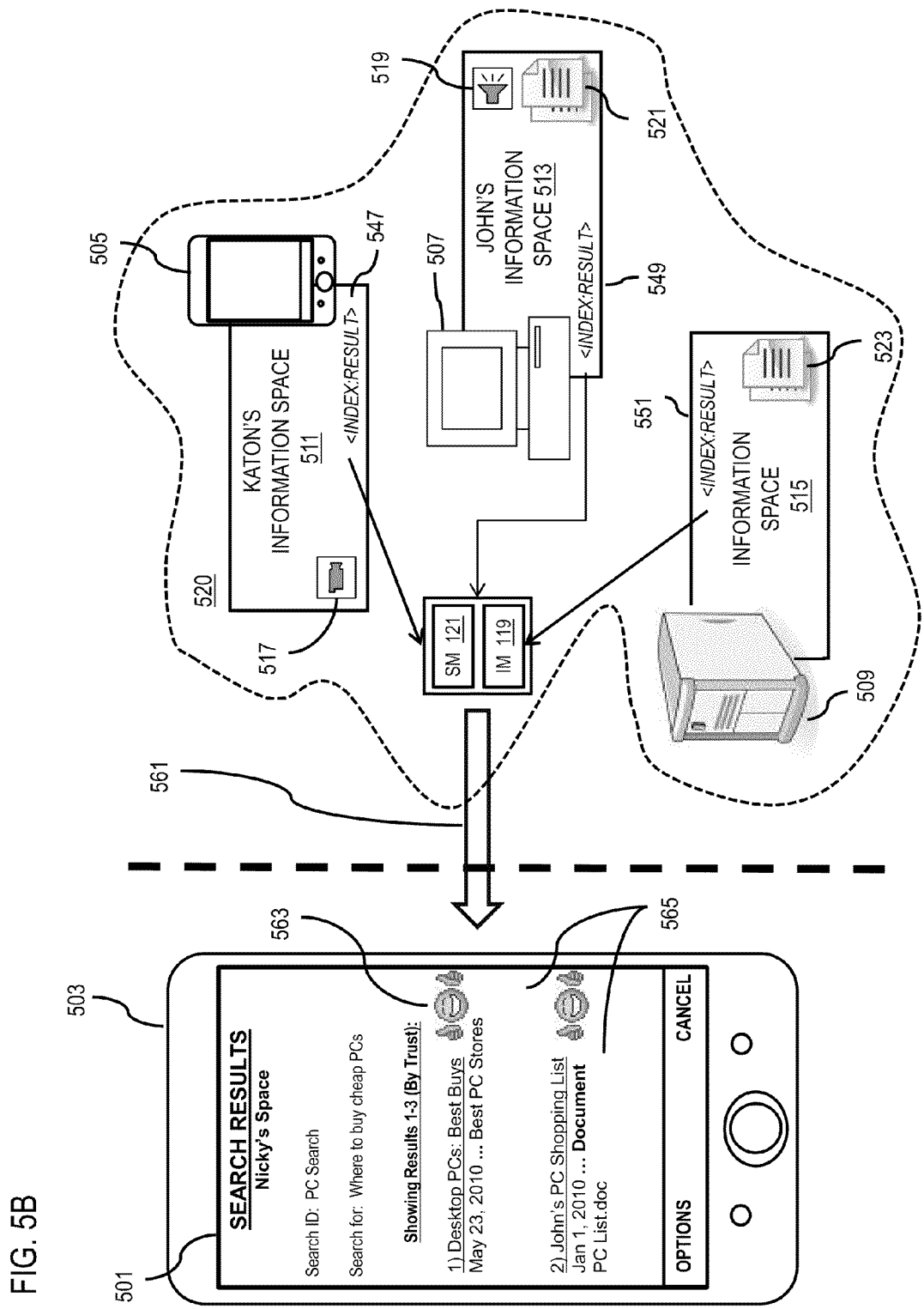

METHOD AND APPARATUS FOR USER BASED SEARCH IN DISTRIBUTED INFORMATION SPACE

BACKGROUND

Modern computing devices (e.g., mobile devices), which feature various methods of connectivity and data access, are for many people nowadays the de facto medium for accessing or storing information, engaging multimedia content, experiencing the internet and communicating with others. Increasingly, more and more applications and services are being developed around the interactivity and interoperability of mobile devices, particularly in the area of information storage and retrieval amongst a select group of interconnected devices. One means of facilitating such interaction amongst a group of devices is through the configuration of individual and personal information spaces in which persons, groups of persons, etc. can place, share, interact and manipulate webs of information with their own locally agreed upon semantics. Interaction between devices within an information space readily enables the application of group defined semantics and organization of information at both a local and a global level. Accordingly, as the volume of the information stored in information spaces increases, service providers and device manufacturers are face significant technical challenges to providing efficient searches over the information space.

SOME EXAMPLE EMBODIMENTS

Therefore, there is a need for an approach for enabling a dynamic user based search within a distributed information space.

According to one embodiment, a method comprises determining to receive a request, at a search system, for conducting a search over one or more information spaces, the search system including one or more autonomous agents associated with the one or more information spaces. The method also comprises determining to distribute the request to the one or more autonomous agents, wherein the one or more autonomous agents process the request according to one or more functions specific to the one or more autonomous agents.

According to another embodiment, an apparatus comprising at least one processor, and at least one memory including computer program code, the at least one memory and the computer program code configured to, with the at least one processor, cause, at least in part, the apparatus to determine to receive a request, at a search system, for conducting a search over one or more information spaces, the search system including one or more autonomous agents associated with the one or more information spaces. The apparatus is also caused to determine to distribute the request to the one or more autonomous agents, wherein the one or more autonomous agents process the request according to one or more functions specific to the one or more autonomous agents.

According to another embodiment, a computer-readable storage medium carrying one or more sequences of one or more instructions which, when executed by one or more processors, cause, at least in part, an apparatus to determine to receive a request, at a search system, for conducting a search over one or more information spaces, the search system including one or more autonomous agents associated with the one or more information spaces. The apparatus is further caused to determine to distribute the request to the one or more autonomous agents, wherein the one or more autonomous agents process the request according to one or more functions specific to the one or more autonomous agents.

According to another embodiment, an apparatus comprises means for determining to receive a request, at a search system, for conducting a search over one or more information spaces, the search system including one or more autonomous agents associated with the one or more information spaces. The apparatus further comprises means for determining to distribute the request to the one or more autonomous agents, wherein the one or more autonomous agents process the request according to one or more functions specific to the one or more autonomous agents.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3B are flowcharts of a process for executing a search over one or more information spaces, according to one embodiment;

FIGS. 5A-5B are diagrams of user interfaces utilized in the processes of FIGS. 2-4, according to various embodiments;

DESCRIPTION OF SOME EMBODIMENTS

Figure 1:
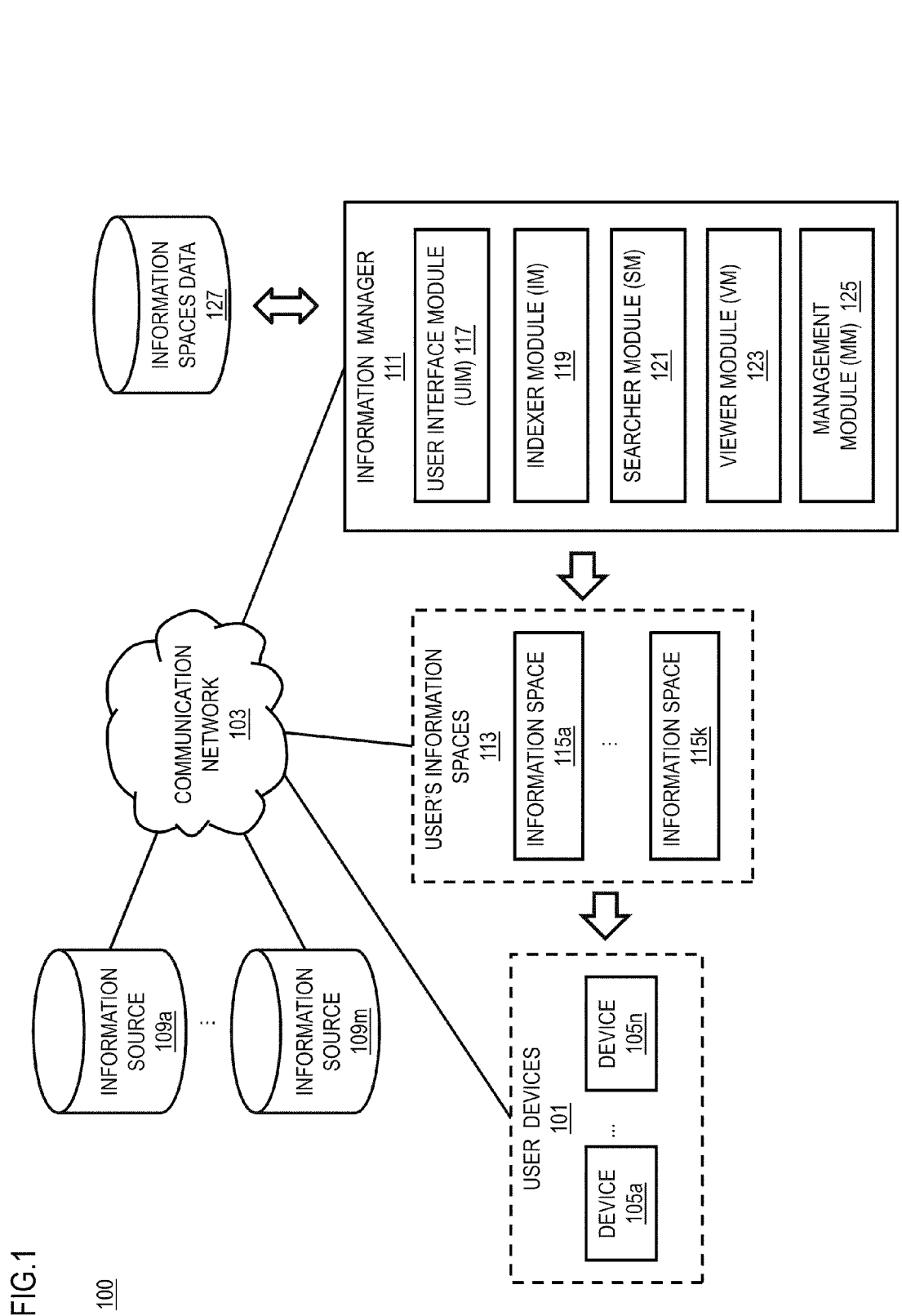
FIG. 1 is a diagram of a system capable of enabling a dynamic user based search within a distributed information space, according to one embodiment.

A method, apparatus, and software are provided for enabling a dynamic user based search within a distributed information space. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" refers to individual and personal information collections accessible and maintained by way of one or more computing devices, wherein one or more device users, groups of users, etc. can place, share, interact and manipulate webs of information with their own locally agreed upon semantics. Having defined the group semantics, interaction may occur amongst the devices whose information collections comprise the information space at a local rather than global level. Also referred to at times as a "smart space," the data comprising an information space may include various storage devices that are either publicly accessible or privately held (only accessible to subscribers/users of the information space). Still further, the information space may be configured or expanded to include more or less information collections relative to established semantics. Semantic precepts may also be adapted relative to the needs, conditions or factors associated with device users within the information space.

Although various embodiments are described with respect to information spaces, it is contemplated that the approach described herein may be used with other types of information bases or combinations thereof.

Computing environments based upon information spaces are proving popular in Semantic Web, context gathering and personal information management situations because of their suitability to delineate or bound information on a per-scenario basis. Information spaces thus provide natural mechanisms for distribution, privacy, trust, and information ownership. In addition, based upon general tuple-space principles, they already information spaces provide the necessary theoretical and practical underpinnings for computing in a similar way to what has already been seen in agent based environments such as M3 and Tripcom. Even further, they are now becoming integrated with technological notions such as cloud computing.

Despite present day applications and uses of information spaces, as well as the their promising future prospects, the ability to conduct efficient searches over information spaces is key to the effectiveness of information spaces, particularly, when the search or query processing involves large data sets from multiple independent sources within a distributed information space or when conducting a search using a device with limited capabilities (e.g., a mobile device with limited processing power, memory, bandwidth, etc.). Furthermore, search request fulfillment is generally performed in a step-by-step manner, usually requiring a first set of search parameters or criteria to be further refined through human intervention in order to finally render a desired result.

To address these issues, FIG. 1 presents a system 100 for enabling the effective rendering of search results as obtained from over a distributed information space. In particular, the system enables such results to be rendered in a manner that does not require direct user intervention beyond the point of search request. Furthermore, system 100 enables search processing to be distributed amongst various devices of the information space, so as to ensure that devices more suited to the particular search processing task at hand is employed.

As shown in FIG. 1, a system 100 comprises a set 101 of user devices having connectivity to information manager 111 and users' information spaces 113 through a communication network 103. The communication network 103 may include one or more information sources 109a-109m that could be physically apart in distant locations from each other but accessible by user devices 101 through the communication network 103. Each user has one or more sets of information extracted from or that part of information resources 109a-109m by information manager 111 based on users requirements (e.g., queries). Information manager 111 stores user's requested information in user specific information spaces 113 and manages and maintains those spaces, in part through operation of a management module (MM) 125 that operates in connection with various other modules 117-123 of the information manager 111. Several of the operations, principles and considerations required for enabling and managing information spaces through use of the management module (MM) 125 is presented in the following paragraphs.

According to one embodiment, an information space S is defined as a 3-tuple containing a unique name n, a graph I of information, often referred to as information content of the information space, nominally conforming to, for example, Resource Description Framework (RDF) semantics, and a set $\rho$ of rewrite rules over that information:

$$S \rightarrow (n, I, \rho)$$

As shorthand representation, $S_n$ is used to refer to information space name as similarly $I_n$ and $\rho_n$ refer to the information content and rules for information space n respectively. It is assumed by the MM 125 that each information space 115a-115k has a unique name and there exists a set of known information spaces.

In one embodiment, information spaces can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 below presents an exemplary RDF data structure or expression.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

The operations to insert, remove and query information from an information space are assumed to exist. The basic form of these operations are defined as follows:

$$\text{insert}(n,g) \rightarrow (n, I \cup g, \rho) \qquad (1)$$

$$\text{remove}(n,g) \rightarrow (n, I-g, \rho) \qquad (2)$$

where g is a graph of information.

The deductive closure for $S_n$ is denoted as $\Delta_n$ where $\Delta$ is the deductive closure mechanism. In set theory, a set of objects, O, is said to exhibit closure or to be closed under a given operation, R, provided that for every object, x, if x is a member of O and x is R-related to any object, y, then y is a member of O.

Querying an information space is made via a query q and the result returned is a subgraph of the space information graph I under a deductive closure that conforms to q. All queries on an information space are actually over the deductive closure $\Delta$ and not the base information content I. A query q on information space n returns a subgraph that conforms to q.

$$\text{query}(n,q) \rightarrow \Delta_n | = q$$

The given operations can be composed together to form more complex operations such as "update". The update of information in an information space can be expressed as the combination of remove and insert. However, if the intersection of inserted subgraph and removed subgraph is not empty, the order in which insert and remove are applied will affect the operation result. For example, given a graph containing a single element {a}, the operation to insert a graph {b} and then immediately remove the graph {b} as an atomic operation results in the graph {a} where if the ordering of insertion and removal is reversed, the graph {a b} is obtained. Therefore, update operation as defined below, returns a valid result only if the intersection of inserted and deleted subgraphs is empty:

$$\text{update}(n, g_i, g_r) \rightarrow \begin{cases} \text{remove}(n, g_r); \text{insert}(n, g_i): & g_i \cap g_r = \varphi \\ \perp : & g_i \cap g_r \neq \varphi \end{cases}$$

As seen in FIG. 1, user devices 101 can include one or more devices 105a-105n. Each user has one or more information spaces 115a-115k that store information deduced from information sources 109a-109m by information manager 111 through local or global reasoning by deductive closure processing.

The information manager 111, by way of the MM 125, also manages and conducts the process of breaking and reconfiguring a user's current information spaces into smaller information spaces. This process can be performed in various manners, such as removing all information and creating multiple individual smaller or even empty information spaces or making complete copies of current information spaces. In addition, the information manager 111, by way of the MM 125 can bind individual information spaces together to create a larger information space. These individual bodies of information may be overlapping in terms of their content. User devices can interact simultaneously with many discrete information spaces. In this case the total information available for a given information space is the union of the deductive closure over all the individual bodies of information. MM 125 manages and conducts the process of projecting and partitioning information spaces similar to split with the difference that it keeps track of projected information spaces. MM 125 also manages and conducts the process of returning the contents of a projected information space back to its original information space.

In one embodiment, metadata (data about other data) such as data describing information spaces, users' queries, etc. are stored in database 127. The information manager 111 uses this data for handling information spaces. Also operating in connection with the information manager 111 are user interface module (UIM) 117, indexer module (IM) 119, searcher module (SM) 121 and viewer module (VM) 123. While it is noted that MM 125 of the information module enables the management, sustainment and configuration of information spaces, modules 117-123 help facilitate search processing over the one or more information spaces.

In one embodiment, the user interface module 117 presents to the user an interface by which the user can specify criteria for the search of information contained within the information space to which the user interface node (e.g., device) is connected. The node writes into the information space a structure nominally expressed in a given protocol or information syntax format (e.g., RDF). As developed, structure written to the information space has associated with it one or more of the following: a unique identifier for that particular search, the type of search to be carried out (semantic, Boolean), the criteria and other data containing information about the time and date the search was requested, current status of the search, search intensity or frequency—i.e., whether the search should be revisited occasionally or regularly, the priority of importance or other relevant metadata that can be used by the other agents listed here for processing the search.

In another embodiment, the viewer module 123 presents to the user an interface by which the user can view retrieved search results. In addition, the user can perform operations upon those results, including but not limited to deletion, saving, combining of various search results into a search result superset, further post-processing and data processing and other relevant operations. In general, the viewer module 123 subscribes or scans for search results not currently known about or those which have been potentially updated since the last check of available search results. These results are then displayed in some suitable form to the user by way of the user interface of the user's device 105. Metadata stored in relation to a search result may include its type and the objects to which that search result points. Also related to the search are the index and the search query that generated it, which may be associated with an index or query identifier value. Other appropriate metadata such as time/date, location, etc., can also be provided.

In another embodiment, the indexing module IM 119 is responsible for generating indices which refer to the various information structures (of various types) in the user's information space. Potentially, many indexes could be kept on various criteria with additional metadata about the indexing process used. Such variation is necessary for enabling search processing to be performed across varying data structures and types. To facilitate result retrieval, the indexer(s) can subscribe for the existence of new information (e.g., emails, pictures, etc.) or for meta-information such as ontologies, etc., from which dynamic queries can be constructed. A dynamic query is one that can change over time due to varying environmental factors such as ontology change/merge, etc. Hence, the indexing module 119 operates in tandem with a searcher module 121 for enabling dynamic search within the information space.

In another embodiment, the searcher module 121 has the capability of executing a search over an index, as generated by the indexer module 119, according to the criteria set out in the search request. Criteria for the search, as well as metadata associated therewith may be specified by the user of the device 105 via a user interface of the device. Alternatively, various criteria and other metadata may be predetermined with respect to a particular type of search to be conducted. The searcher module's 112 responsibility is to link search requests to indexes and the final objects together. The module maintains the property that the objects pointed to by the index entries in the indicies searched are a superset of the results of that search. As such, the searcher module 121 can monitor previous search results and if the above condition is not met then the search can be marked accordingly. Moreover, the searcher module 121 can write additional metadata about the results and search request, such as to indicate a confidence level, trust, relevancy data, etc.

As will be discussed further with respect to subsequent embodiments herein, the various modules 117-125 as described above interact and at times, operate in tandem within the information manager 111 to facilitate search across one or more information spaces 115. It is noted that in certain instances, the functions and operations set forth with respect to modules 117-123 may be dispatched as "agents" (e.g., injected and/or connected to other processes so as to achieve a particular operational/functional outcome) across devices and/or information spaces. Various operational and functional outcomes may be realized as a result of execution of system 100, and the various components thereof, some of which may include, but is not limited to:

- The splitting of a search system into individual, autonomous agents (e.g., knowledge processors)
- The distribution of said agents over the devices and infrastructure that defines an information space 115
- The ability of the user interface module 117 to place search requests in the form of intentions into the space such that those requests can be processed by one or more suitable agents without direct involvement by the user interface module 117
- The ability to utilize multiple agents for the processing of the intention of a search and report results back separately and simultaneously
- The ability to utilize multiple, independent indexers as generated by the indexer module 119 over the space tailored for specific structures of information
- The ability to index over RDF structures ranging from individual triples through RDF named graphs and molecules
- The ability for the indexer 119 to utilize subscription mechanisms provided by the space to alert for new information
- The ability to utilize the deductive closure mechanisms of the space to gain access to "hidden" information through inference rules
- The ability for the indexer 119 to subscribe directly for ontology information such as predicates, classes and other relationships in order to dynamically alert the indexing characteristics at run-time
- The ability of a search module 121 to refer and record both to the criteria by which the search was made (e.g., pointing into the index itself) and to the object to which the index points, thus allowing analysis of the change to the object and the original indexing and search criteria over time.
- The ability for a viewer agent 123 to selectively process search results and provide suitable user-interface representations based upon not only the object but the particular characteristics of the search such as trust, relevance and other meta-data associated with said indices and search results
- The ability to record meta-data such as trust, belief, relevance, dates, times etc in search intentions and utilize this information for the processing and analysis of said indices
- The ability to analyze metadata such as trust, belief, relevance, dates, times etc in the overall processing of the system and by agents that exist outside of the current set of four agents that comprise a minimal system.
- The ability to specialize each of the four basic categories of agents (and potentially unify them) such that particular agents can be tailored specifically towards user situations and particular kinds of information
- The ability to distribute said agents over multiple devices thus allowing complex search operations to be performed from small, low powered devices due to the fact that complex, CPU and memory resource operations such as search and indexing can be moved to those devices which support such operations better.

As shown in FIG. 1, the system 100 comprises a user devices 101 having connectivity to user information spaces 113 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The user device 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 101 can support any type of interface to the user (such as "wearable" circuitry, etc.).

By way of example, the user devices 101, information spaces communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The specification now proceeds with a description of the various processes engaged by the above described modules 117-125 and other components of the system 100 for enabling a dynamic user based search within a distributed information space. With respect to FIG. 2, a flowchart depicting the process for requesting a search to be conducted over one or more information spaces is shown, according to one embodiment. In particular, this process 200 corresponds primarily, but is not limited to, the interaction between the user interface module 117 and the searcher module 121. Beginning with step 201, the user enters via the user interface as generated by the user interface module 117 a request to conduct a search over one or more information spaces. Among other things, the request may include a user specified search context, search term, criteria, etc. As described above, the search system 100 includes one or more autonomous agents—i.e., search agents, interface agents—as generated by corresponding searcher module 121 and user interface module 117 accordingly.

Once the search request is established, a next step 203 is performed wherein metadata is associated with the request, the search, results of the search, one or more indices associated with the information space, previous other searches or a combination thereof. It is noted that the metadata may be associated in one of three ways: (1) directly by the user based on additional input pertaining to the search request as specified via the user interface of the user device; (2) without any user input by the information manager 111 based on historical search patterns, context information regarding the user, search profile data, etc.; (3) a combination of 1 and 2. Regardless of the method employed, the metadata provides additional detail and context regarding the search within the information space for generating search results. Resultantly, in step 205, the request and associated metadata are encoded into a search request message conforming to an information syntax format—i.e., RDF message for transmission within the search system 100 via the XML protocol. As yet another step 207, the search request message is then passed on to the searcher module 121 from the user interface module 117, wherein the request is distributed by the searcher module 121 accordingly as/to one or more autonomous search agents within the information space.

FIGS. 3A-3B are flowcharts of a process for executing the search over one or more information spaces, according to one embodiment. In particular, processes 300 and 308 pertain to the phase of execution of system 100 after initialization of the search request as described in FIG. 2. Furthermore, processes 300 and 308 correspond primarily, but are not limited to, the interaction between the searcher module 121 and the indexer module 119. As a first step 301 in FIG. 3A, one or more indices are generated based at least in part on the information syntax format in which the search request was received. For the sake of facilitating the search process, the searcher module 121 will formulate an index in conjunction with the indexer module 119 as is best suited for the type of request to be fulfilled, the type of data to be accessed over the information space, known network conditions, etc.

In a next step 303, for the purposes of rendering a search result in response to the submitted request, the searcher module 121 in connection with the indexer module 119 subscribes to the one or more information spaces to which the search is confined. The subscription process enables any submitted search agents and/or index agents to be alerted when one or more changes occur within the information space. So, for example, when merges occur or newly added data sets are made available, the active search or index agents corresponding to a given search request may readily account for such changes in content or update their result sets accordingly.

As yet another step 305, the indexer module 119 can utilize one or more deductive closure mechanisms to generate the one or more indices to be activated across the information space. In addition, the one or more indices may be generated based on ontology information associated with the one or more information spaces, as set forth in step 307. It is noted that steps 301-307, while presented in a sequential manner, may be performed in differing sequence or at times concurrently depending on the search requirements, criteria, etc. Indeed, the indexer module and searcher module produce or act as agents appropriately within the information space to ensure results are rendered.

With respect now to FIG. 3B, a first processing step 309 for executing the search includes mapping the search request against one or more information spaces, one or more indices of the one or more information spaces, previous other search requests or a combinations thereof. The mapping process includes anchoring or limiting the search process to a specific data set within the information space or the information space as a whole. From thereon, as a next step 311, search processing is then performed against the mapped one or more of the information spaces based at least in part on a relevancy associated with the one or more information spaces, the one or more indices of the one or more information spaces, the previous other searches or the combination thereof. It is noted that the indices will operate in tandem with the search procedure (agent) to enable the compilation and/or aggregation of relevant search results.

Figure 4:
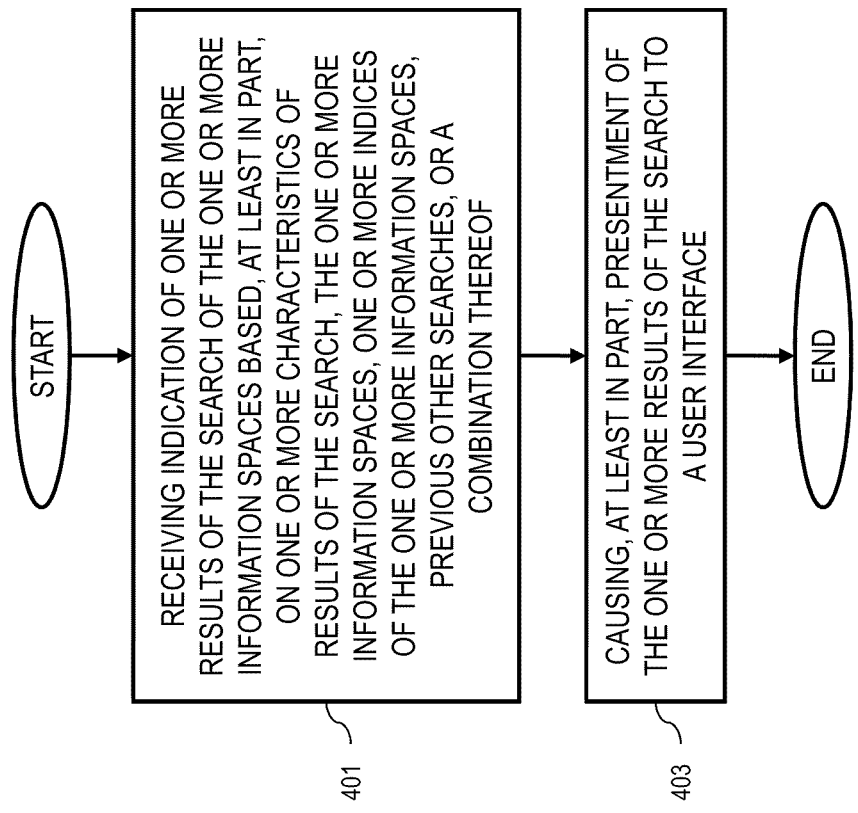
FIG. 4 is a flowchart of a process for presenting one or more results of a search as retrieved from one or more information spaces, according to various embodiments.

FIG. 4 is a flowchart of a process for presenting one or more results of a search as retrieved from one or more information spaces, according to various embodiments. In particular, this process 400 corresponds primarily, but is not limited to, the interaction between the viewer module 123, the indexer module 119 and the searcher module 121. As a first step 401, an indication of one or more results corresponding to the search request is received by the viewer module 123. Search results are received based, at least in part, on one or more characteristics of the search results, the one or more information spaces, one or more indices as deployed within data sets defined within the information spaces, previous other searchers or a combination thereof. As a next step 403, pursuant to the return of the search results, the user interface of the user device from which the search request originated is caused to present the search results. It is noted that search results may be presented in various ways as specified by the user or based on initial search conditions, including presented based on relevancy, most recent date activity, source trust rating, other user recommendation, etc.

Figure 2:
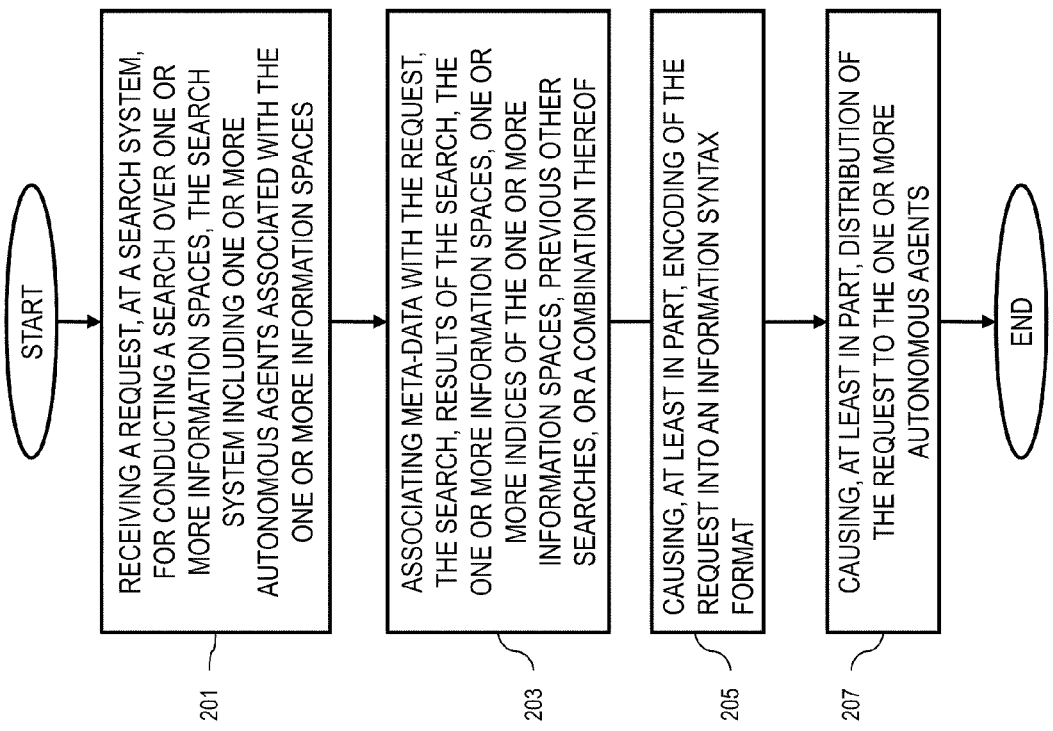
FIG. 2 is a flowchart of a process for requesting a search to be conducted over one or more information spaces, according to one embodiment.
Figure 5A:
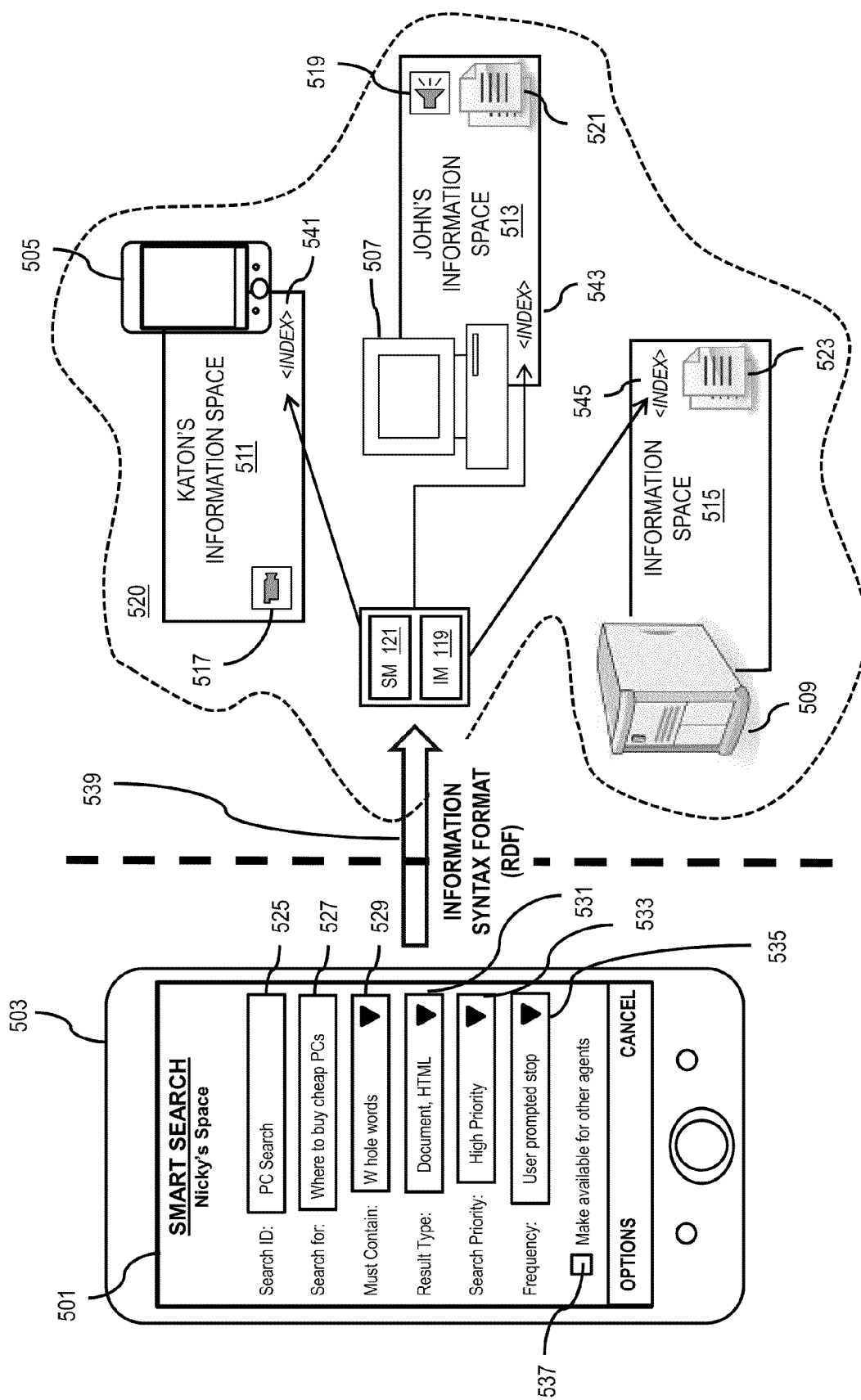

FIGS. 5A-5B are diagrams of user interfaces utilized in the processes of FIGS. 2-4, according to various embodiments. A specific use case involving execution of these processes is also presented in detail with respect to the figures, wherein a specific mobile device 503 user's (Nicky's) information space 520 is comprised of individual information spaces 511-515 maintained or generated by other devices. The other users and devices of the information space include, in this example, a user named Katon who operates a mobile device 505 that maintains information space 511, a user named John who operates a desktop computer 507 that maintains information space 513 and a publicly held information server 509 maintained by a content provider (e.g., online content provider) for maintaining information space 515. Each respective information space includes data of varying types, including video content 517 within information space 511, audio content 519 and word processing documents 521 within information space 513 and online content 523 within information space 515. Though depicted as separate, user device 503 as operated by Nicky is also part of the information space 520 and hence accessible to other users accordingly. In addition, the information spaces 511 and 513 may share one or more information sets, or may include at least portions of one or more other information spaces.

In keeping with the example, the user (Nicky) accesses an exemplary interface 501 as rendered to the mobile device 503 by a user interface module 117 operable in connection with the device. The exemplary interface features various fields that may be populated by Nicky, including but not limited to, a user specified search identifier 525 (alphanumeric), a search string field 527 for enabling user specification of the search variable, a search criteria indicator 529 presented as a drop down menu for indicating one or more search parameters (e.g., whole words, AND, OR), a user preferred result type 531 presented as a drop down menu for enabling the user to specify the type data they'd like returned pursuant to the search, a search priority indicator 533 for prioritizing a particular search against others that may be initiated concurrently, a search results frequency indicator 535 for specifying the rate or pace at which the search operation is to be performed against the information space (e.g., perform until user specified stop, every X hours, upon update of the information space, etc.). The user is also given the option 537 to make the search as specified available for use in connection with other search agents. It is noted that search field entries and selection options are exemplary in nature. Indeed, a more expansive or limited user interface may be presented depending on the specific requirements and functional needs of the user or the information space.

In this example, the user indicates the search identifier 525 as "PC Search", the search string as "Where to buy cheap PCs", a whole word search criteria 529 (e.g., which affects the relevancy of search results), a result type 531 as documents and/or HTML, a high search priority 533 and user directed stop with respect to search frequency 535. Having received this input from the user, the data is then encoded as metadata along with a search request message (based in part on the provided search string), that is transmitted to the information space 520 to initiate the search process. Resultantly, the search module 121 and indexer module 119 operate to generate or as agents for distributing this search request across the multiple entities of the user information space 520.

Based at least in part on the search request type, the metadata associated therewith and the type of information spaces 511-515 to be searched, one or more indices are formulated for placement within the information space and/or data content therein. So, for example, an index 541, 543 and 545 is formulated based, at least in part, on the specific data types presented by respective information spaces 511-515. As mentioned earlier, dispatching of the indexer module and search module, i.e., as one or more autonomous agents based on a sole search request, enables more effective and efficient search processing across differing user devices 505, 507 and 509 with differing capabilities.

With respect now to FIG. 5B, results as retrieved pursuant to the search are returned by the one or more indices 541-545 as result sets, depicted herein as index results 547-551. As mentioned before, individual results corresponding to the search request/query may be aggregated into a final result set, subject to deductive closure processing, etc. For the example in question, the audio 519 and video content 517 available within the information space 520 is clearly not part of the result set given that the search request specified result types corresponding to documents and/or HTML (e.g., web based content). The result sets are then compiled and returned (e.g., transmitted 561) to the viewer module 123, so as to be made available to the user interface 501 of Nicky's device 503 for review. In this example, the results are presented as a list prioritized by trust, with trust being indicated by a trust indicator or icon 563. In this particular case, the top search result 565 corresponding to the task or intention of "Where to buy cheap PCs" corresponds to that obtained from information space 515; a web-based article from a trusted news website. Of particular note is the fact that the information space need not be limited in scope to only conveyors of publicly held data, but as in this example, may include publicly available information.

The processes described herein for enabling a dynamic user based search within a distributed information space may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
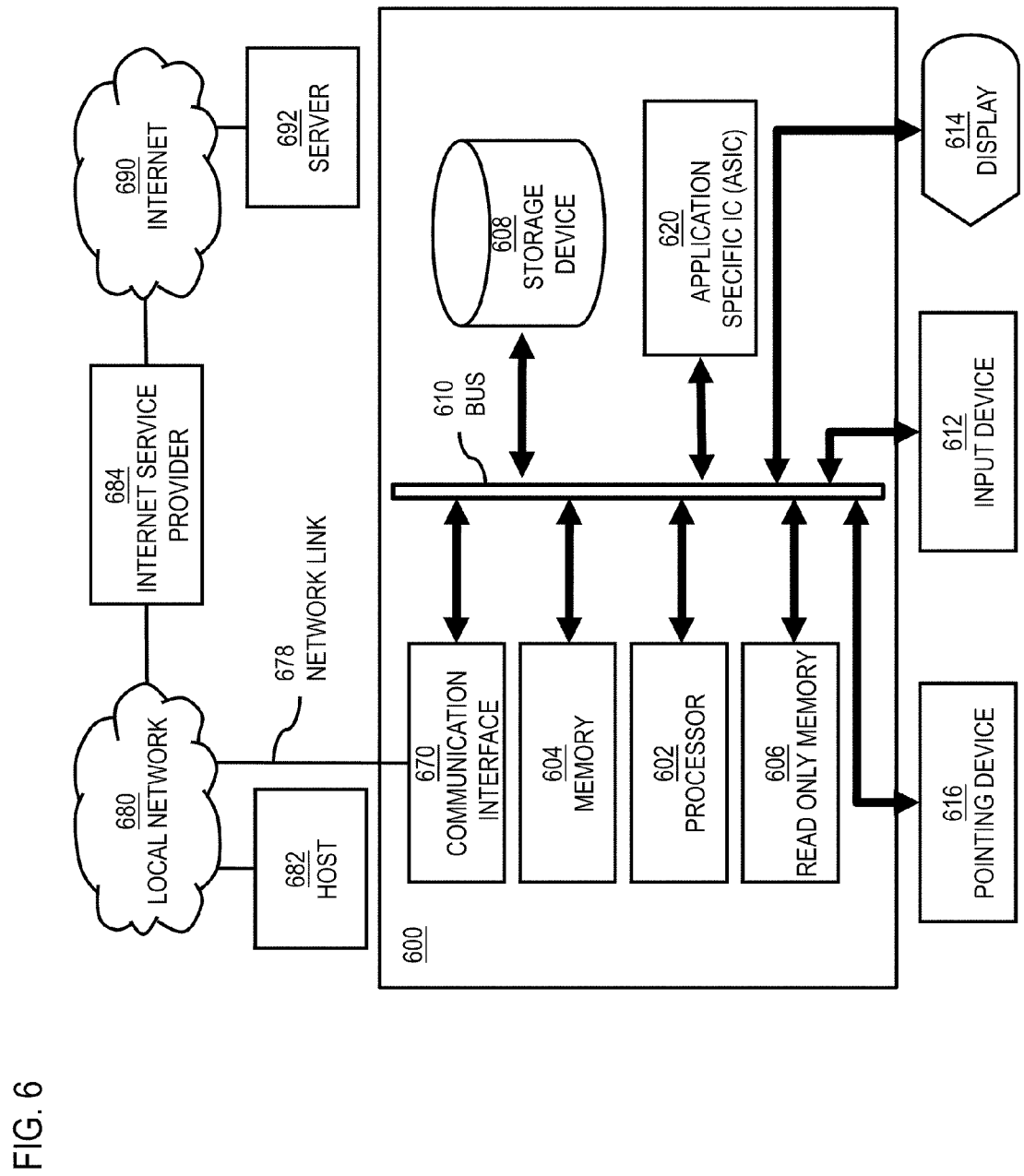
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to enable a dynamic user based search within a distributed information space as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of enabling a dynamic user based search within a distributed information space.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to enabling a dynamic user based search within a distributed information space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for enabling a dynamic user based search within a distributed information space. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for enabling a dynamic user based search within a distributed information space, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for enabling a dynamic user based search within a distributed information space to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
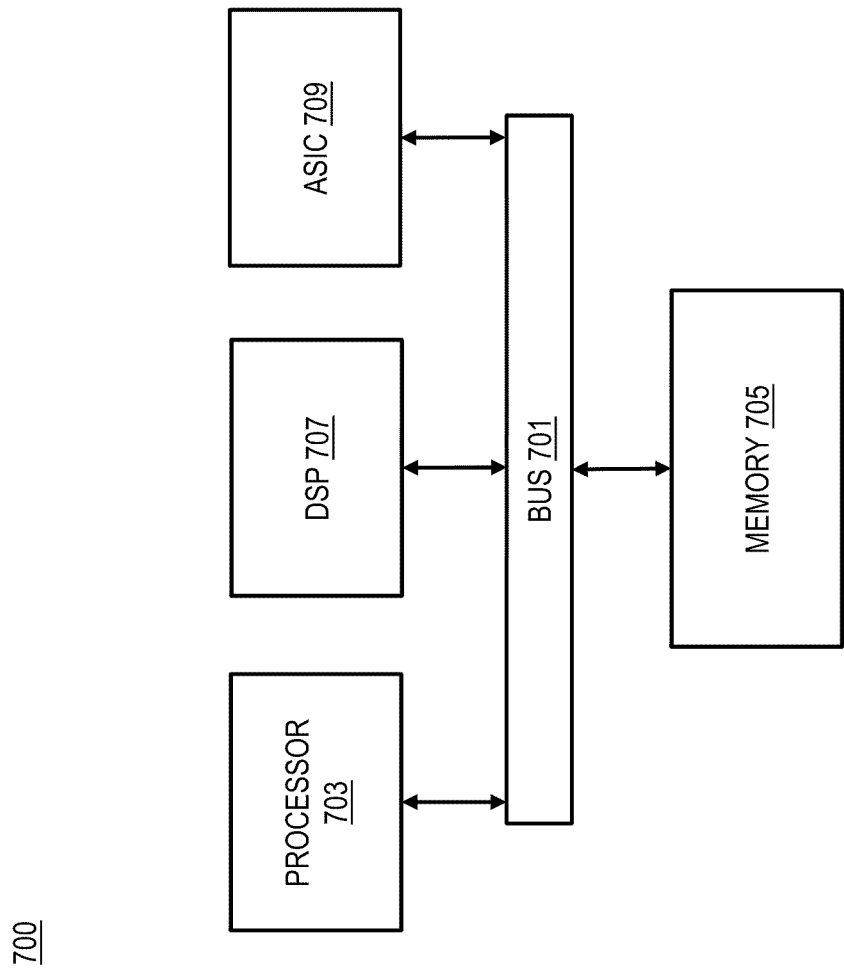
FIG. 7 is a diagram of a chip set that can be used to implement an embodiment of the invention.

FIG. 7 illustrates a chip set or chip 700 upon which an embodiment of the invention may be implemented. Chip set 700 is programmed to enable a dynamic user based search within a distributed information space as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of enabling a dynamic user based search within a distributed information space.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable a dynamic user based search within a distributed information space. The memory 705 also stores the data associated with or generated by the execution of the inventive steps.

Figure 8:
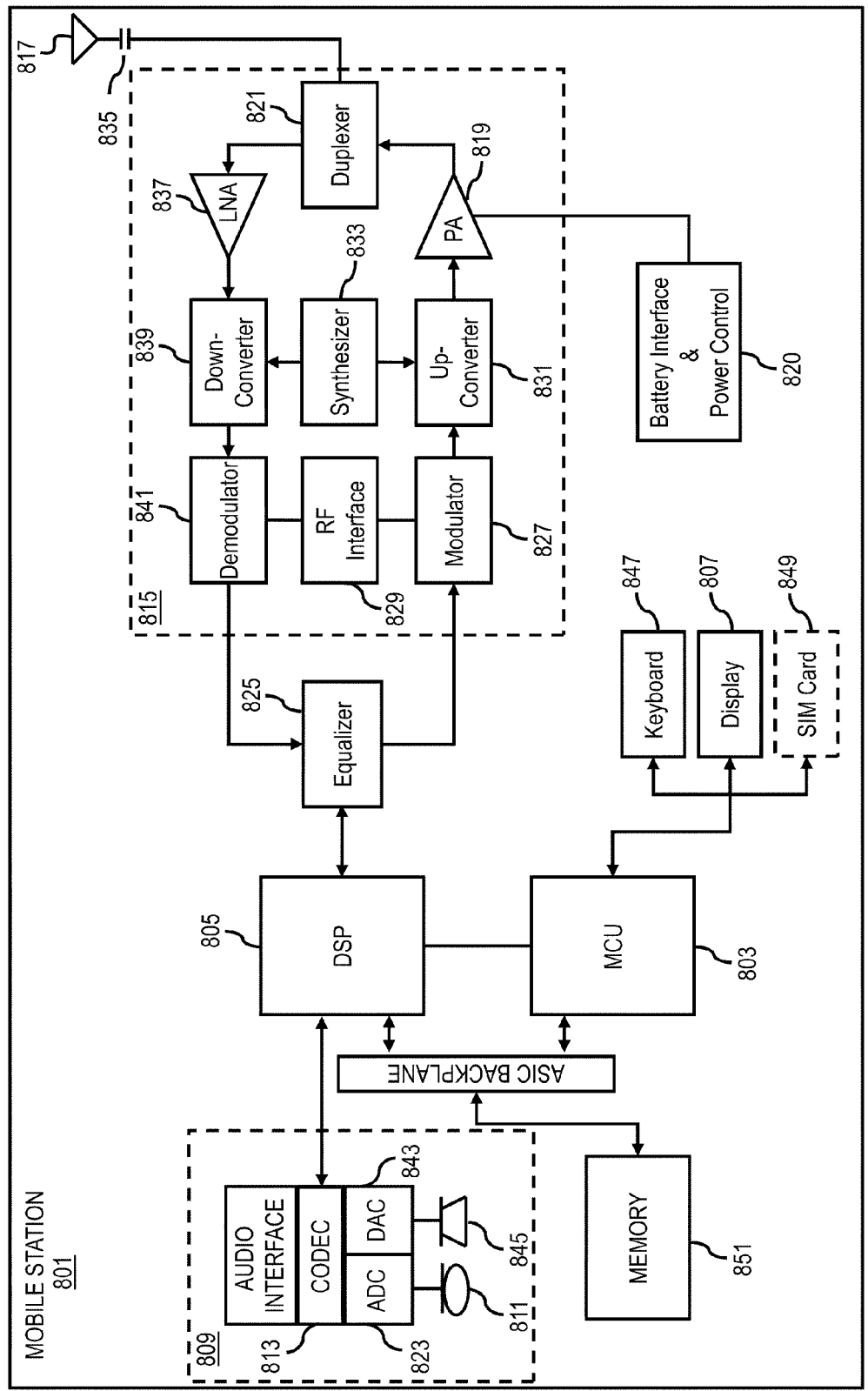
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of enabling a dynamic user based search within a distributed information space. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of enabling a dynamic user based search within a distributed information space. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to enable a dynamic user based search within a distributed information space. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining to receive a request, at a search system, for conducting a search over one or more distributed information spaces, the search system including one or more autonomous agents associated with the one or more distributed information spaces, wherein the distributed information spaces include one or more indices at one or more user devices, the indices being accessed by the one or more autonomous agents to search information at the one or more user devices; and
    determining to distribute the request to the one or more autonomous agents,
    wherein the one or more autonomous agents process the request according to one or more functions specific to the one or more autonomous agents.

2. A method of claim 1, further comprising:
    determining to generate meta-data associated with at least one or more of the request, the search, results of the search, the one or more distributed information spaces, the one or more indices of the one or more distributed information spaces, and previous other searches,
    wherein the meta-data include at least one or more of a trust, a belief, a relevance, and a context associated with at least one or more of the request, the search, the results of the search, the one or more distributed information spaces, the one or more indices of the one or more distributed information spaces, and the previous other searches.

3. A method of claim 2, wherein the autonomous agents further process the request based, at least in part, on the meta-data.

4. A method of claim 1, further comprising:
    determining to encode the request into an information syntax format,
    wherein the distribution and processing of the request is based, at least in part, on the encoded request.

5. A method of claim 1, wherein the one or more autonomous agents includes at least one or more user interface agents, and wherein the one or more user interface agents receive the request and place the request into the one or more distributed information spaces to cause the distribution of the request.

6. A method of claim 1, wherein the one or more autonomous agents include at least one or more indexer agents, and wherein the one or more indexer agents generate the one or more indices of the information in at least one or more of the one or more distributed information spaces, in the request, and in previous other requests.

7. A method of claim 6, wherein the one or more indexer agents are tailored to an information structure used in the one or more distributed information spaces.

8. A method of claim 6, wherein the one or more indexer agents perform any one or more of the following:
    determining to generate the one or more indices based, at least in part, on an information syntax format;
    determining to subscribe to the one or more distributed information spaces, wherein the subscription alerts the one or more indexer agents to one or more changes in the one or more distributed information spaces;
    determining to utilize one or more deductive closure mechanisms to generate the one or more indices; and
    determining to generate the one or more indices based, at least in part, on ontology information associated with the one or more distributed information spaces.

9. A method of claim 1, wherein the one or more autonomous agents include at least one or more search agents, and wherein the one or more search agents map the request against at least one or more of the one or more distributed information spaces, the one or more indices of the one or more distributed information spaces, and previous other searches.

10. A method of claim 9, wherein the one or more search agents perform searches of the one or more distributed information spaces based, at least in part, on a relevancy associated with at least one or more of the one or more distributed information spaces, the one or more indices of the one or more distributed information spaces, and the previous other searches.

11. A method of claim 1, wherein the one or more autonomous agents include at least one or more viewer agents, and wherein the one or more viewer agents present one or more results of the search based, at least in part, on at least one or more of one or more characteristics of results of the search, the one or more distributed information spaces, the one or more indices of the one or more distributed information spaces, and previous other searches.

12. A method of claim 1, wherein the one or more autonomous agents include at least each of one or more user interface agents, one or more indexer agents, one or more search agents, and one or more viewer agents.

13. A method of claim 1, wherein the one or more autonomous agents operate separately and simultaneously to process the request.

14. A method of claim 1, wherein the request is initiated by one or more users associated with the one or more distributed information spaces.

15. An apparatus comprising:
at least one processor; and
at least one memory including computer program code for one or more programs,
the at least one memory and the computer program code configured to, with the at least one processor, cause the apparatus to perform at least the following:
determine to receive a request, at a search system, for conducting a search over one or more distributed information spaces, the search system including one or more autonomous agents associated with the one or more distributed information spaces, wherein the distributed information spaces include one or more indices at one or more user devices, the indices being accessed by the one or more autonomous agents to search information at the one or more user devices; and
determine to distribute of the request to the one or more autonomous agents,
wherein the one or more autonomous agents process the request according to one or more functions specific to the one or more autonomous agents.

16. An apparatus of claim 15, wherein the apparatus is further caused to:
determine to generate meta-data associated with at least one or more of the request, the search, results of the search, the one or more distributed information spaces, the one or more indices of the one or more information spaces, and previous other searches,
wherein the meta-data include at least one or more of a trust, a belief, a relevance, and a context associated with at least one or more of the request, the search, the results of the search, the one or more distributed information spaces, the one or more indices of the one or more distributed information spaces, and the previous other searches.

17. An apparatus of claim 15, wherein the apparatus is further caused to:
determine to encode the request into an information syntax format,
wherein the distribution and processing of the request is based, at least in part, on the encoded request.

18. An apparatus of claim 15, wherein the one or more autonomous agents includes at least one or more user interface agents, and wherein the one or more user interface agents receive the request and place the request into the one or more distributed information spaces to cause the distribution of the request.

19. An apparatus of claim 15, wherein the one or more autonomous agents include at least one or more indexer agents, and wherein the one or more indexer agents generate the one or more indices of information in at least one or more of the one or more distributed information spaces, in the request, and in previous other requests.

20. An apparatus of claim 15, wherein the one or more autonomous agents include at least one or more search agents, and wherein the one or more search agents map the request against at least one or more of the one or more distributed information spaces, one or more indices of the one or more distributed information spaces, and previous other searches.

* * * * *